United States Patent [19]

Moore

[11] Patent Number: 5,311,702
[45] Date of Patent: May 17, 1994

[54] DOOR SEALS

[75] Inventor: Donald J. Moore, Wolston, United Kingdom

[73] Assignee: Jaguar Cars Limited, United Kingdom

[21] Appl. No.: 906,798

[22] Filed: Jun. 30, 1992

[30] Foreign Application Priority Data

Jul. 3, 1991 [GB] United Kingdom ............... 9114421

[51] Int. Cl.⁵ .............................................. E06B 7/16
[52] U.S. Cl. ................................. 49/495.1; 49/475.1; 296/135; 296/146.3; 296/146.9; 296/146.14
[58] Field of Search ................ 49/475, 489, 493, 495, 49/485, 440, 441, 490, 496, 498; 296/135, 107, 146 F, 146 K

[56] References Cited

U.S. PATENT DOCUMENTS

| 2,746,791 | 5/1956 | Gosselin | 296/135 |
| 4,800,681 | 1/1989 | Skillen et al. | 49/441 X |
| 4,970,828 | 11/1990 | Mesnel et al. | 49/440 X |
| 5,003,792 | 4/1991 | Mesnel et al. | 49/475 X |
| 5,010,689 | 4/1991 | Vaughan | 49/489 X |
| 5,014,464 | 5/1991 | Dupuy et al. | 49/440 |
| 5,050,663 | 9/1991 | Rhoads et al. | 296/107 X |

FOREIGN PATENT DOCUMENTS

| 0239115 | 9/1987 | European Pat. Off. . |
| 2304497 | 3/1975 | France . |
| 60-104435 | 6/1985 | Japan . |
| 2092722 | 4/1990 | Japan ............................... 296/146 F |
| 0227323 | 9/1990 | Japan ...................................... 49/441 |
| 781155 | 8/1957 | United Kingdom . |
| 1484962 | 9/1977 | United Kingdom . |
| 1511947 | 5/1978 | United Kingdom . |
| 2186619 | 8/1987 | United Kingdom . |

Primary Examiner—Peter M. Cuomo
Assistant Examiner—Jerry Redman
Attorney, Agent, or Firm—Davis, Bujold & Streck

[57] ABSTRACT

A door seal is formed as an elongate strip of resilient material, the strip defining a body section having formations by which it may be secured around a door opening so that it is disposed inboard of a sideglass of the door when the door is closed and the sideglass raised; a lip section extending outwardly from the body section, the lip section being joined to the body section by a root portion and having a tip at the end remote from the root portion, the tip being directed back towards the body section such that when the door is closed with the sideglass raised, the tip will be deflected inwardly towards the root portion and the lip section will engage the sideglass on its outer surface.

10 Claims, 2 Drawing Sheets

DOOR SEALS

BACKGROUND TO THE INVENTION

The present invention relates to door seals and in particular to door seals for motor vehicles.

Currently door seals for motor vehicles which are intended to provide a seal between the vehicle body and the sideglass of the door, comprise a resilient extrusion which is located around the door opening inboard of the sideglass, so that it is abutted by the sideglass, when the door is closed and the sideglass is in its raised position. With such seals, water may collect on the top edge of the sideglass, so that when the door is opened it may drop down onto the occupant of the vehicle. Also, when fitting the door, because of tolerance variations the edge of the sideglass may not be parallel to the edge of the door opening and there will be a visible gap of varying width which will detract from the appearance of the vehicle.

SUMMARY OF THE INVENTION

According to one aspect of the present invention, a door seal for a vehicle for providing a seal between a door opening and a sideglass of a door comprises, an elongate resilient strip having a body section adapted to be secured to the vehicle around the door opening, so that the body section is disposed inboard of the sideglass when the door is closed and the sideglass raised; and a lip section extending outwardly from the body section at an acute angle thereto, the lip section having a root portion by which it is attached to the body section and a tip remote from the root portion, the tip being directed back towards the body section such that when the door is closed with the sideglass raised, the tip will be deflected inwardly towards the root portion and the lip will engage the sideglass on its outer surface.

The lip of the door seal according to the present invention will provide a seal with the outer surface of the glass, thereby preventing water from collecting along the top edge. Furthermore, engagement of the lip along the outside of the sideglass will provide a clean line obscuring any variation in the gap between the edge of the sideglass and the door opening.

BRIEF DESCRIPTION OF THE DRAWINGS

An embodiment of the invention is now described, by way of example only, with reference to the accompanying drawings, in which.

DESCRIPTION OF A PREFERRED EMBODIMENT

Figure 1:
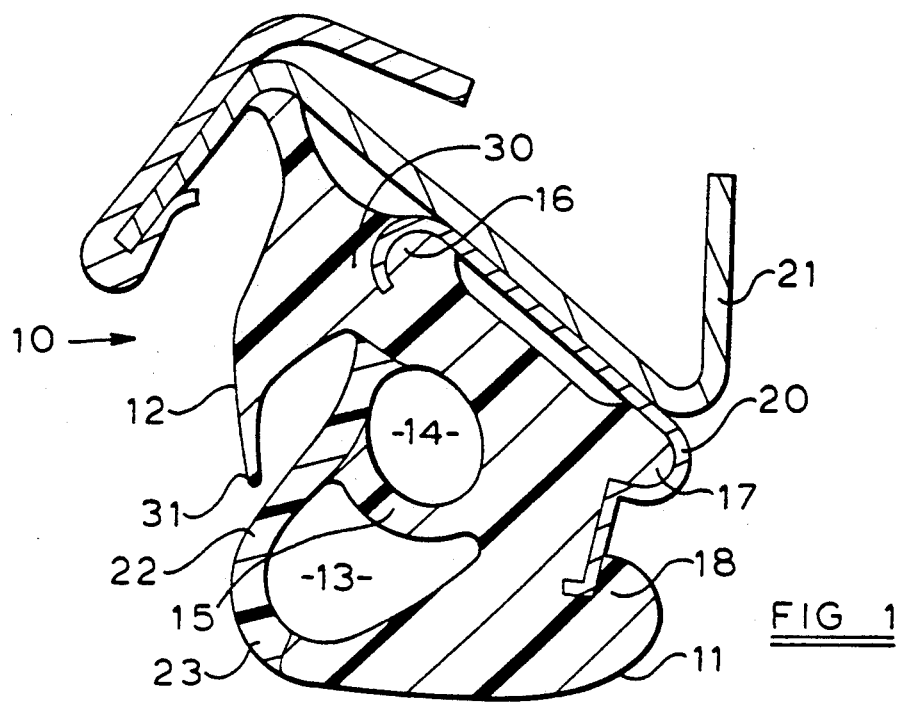
FIG. 1 is a section through a door seal in accordance with the present invention.

As illustrated in the accompanying drawings a door seal 10 comprises an extrusion of a resilient material, for example a natural or synthetic rubber composition, having a body section 11 and a lip section 12. The body section 11 is tubular defining a pair of ducts 13 and 14 separated by a web portion 15. The body section 11 has formations 16, 17, 18 for engagement of corresponding formations of a channel section 20 which may be secured, for example, to the cantrail 21 defining the upper edge of the door opening of a vehicle. Portion 22 of the body section 11 which defines part of the walls of the ducts 13 and 14, provides a sealing surface against which the sideglass 25 of a door will engage when the door is closed and the sideglass 25 raised.

The lip section 12 is connected to the body section 11 by a root portion 30 and extends outwardly from the body section 11 at an acute angle thereto. The tip 31 of the lip is turned back towards portion 22 of the body section 11.

Figure 2:
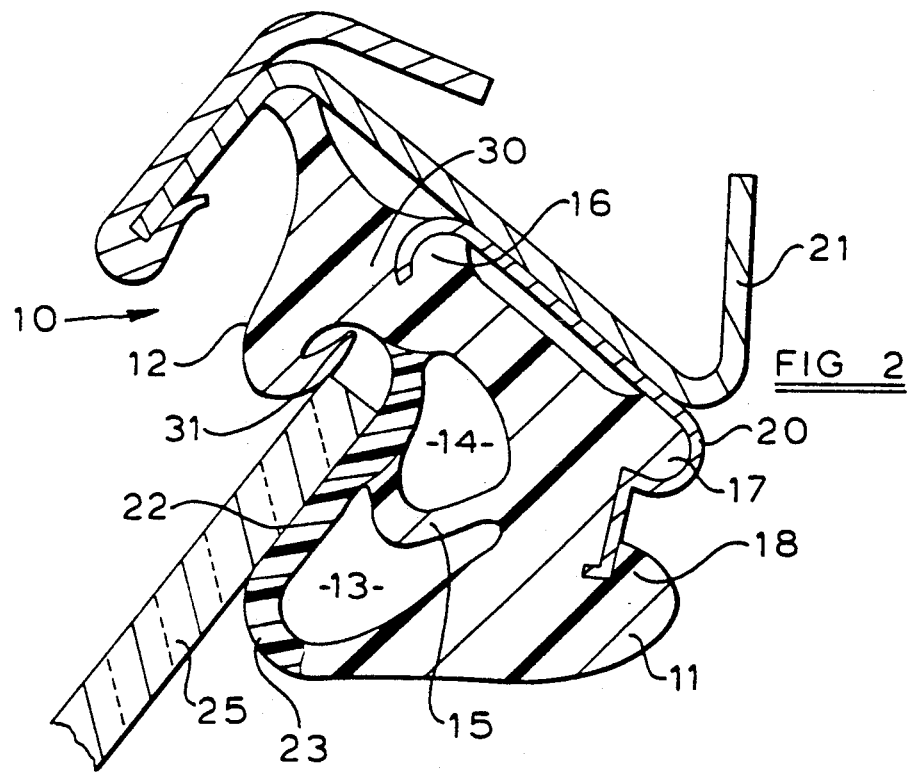
FIG. 2 is a section through the door seal illustrated in FIG. 1, when engaged by the sideglass of a vehicle door.

As illustrated in FIG. 2, when the door is closed and the sideglass 25 raised, the sideglass 25 will engage and deform the body section 11 located inboard thereof, so that portion 22 thereof is maintained in sealing engagement with the sideglass 25. This seal will serve predominently to reduce noise within the vehicle. The lip section 12 is engaged by the sideglass 25, so that the tip 31 is turned under and displaced towards its root portion 30. The lip section 12 thereby engages and seals against the outer surface of sideglass 25, to provide a seal against the ingress of water and also to provide a clean line between the seal 10 and the sideglass 25.

In addition to sealing correctly when the door is closed with the sideglass 25 raised, the seal 10 must also be capable of sealing correctly when the sideglass 25 is raised with the door closed. To this end, a radiussed leading portion 23 is provided to portion 22 of the body section 11, so that when the sideglass 25 is raised it will first engage the radiussed leading portion 23 causing the body portion to be compressed, so that the sideglass 25 will then slide along the portion 22. The edge of the sideglass 25 as it moves upwardly, will engage the tip 31 of lip section 12 causing it to be turned back towards the root portion 30 and ensuring correct sealing of the lip section 12 against the outside of sideglass 25.

In order to ensure correct sealing between portion 22 of the seal 10 and the sideglass and also allow for tolerance variations in the gap between the sideglass 25 and the door opening, the various sections of the seal 10 may be tuned by varying the resilience of the material from which the seal 10 is made, the thicknesses of the lip section 12, web portion 15, portion 22 and other portions of the seal 10 and the dimensions of the ducts 13 and 14, so that sufficient resilience is provided to maintain sealing engagement within the tolerance variations of the gap between the door and the door opening. Furthermore, the portion 22 of the seal 10 may be formed from a softer material, for example a closed cell natural or synthetic rubber composition, than the remainder of the seal 10 in order to ensure that portion 22 will deform to conform to the abutting surface of the sideglass 25. Such composite seals may be formed by coextrusion of the materials. Furthermore, a low friction coating may be applied to portion 22 and its leading portion 23 to ensure that the sideglass 25 will slide smoothly thereover when being raised or lowered with the door closed.

Figure 3:
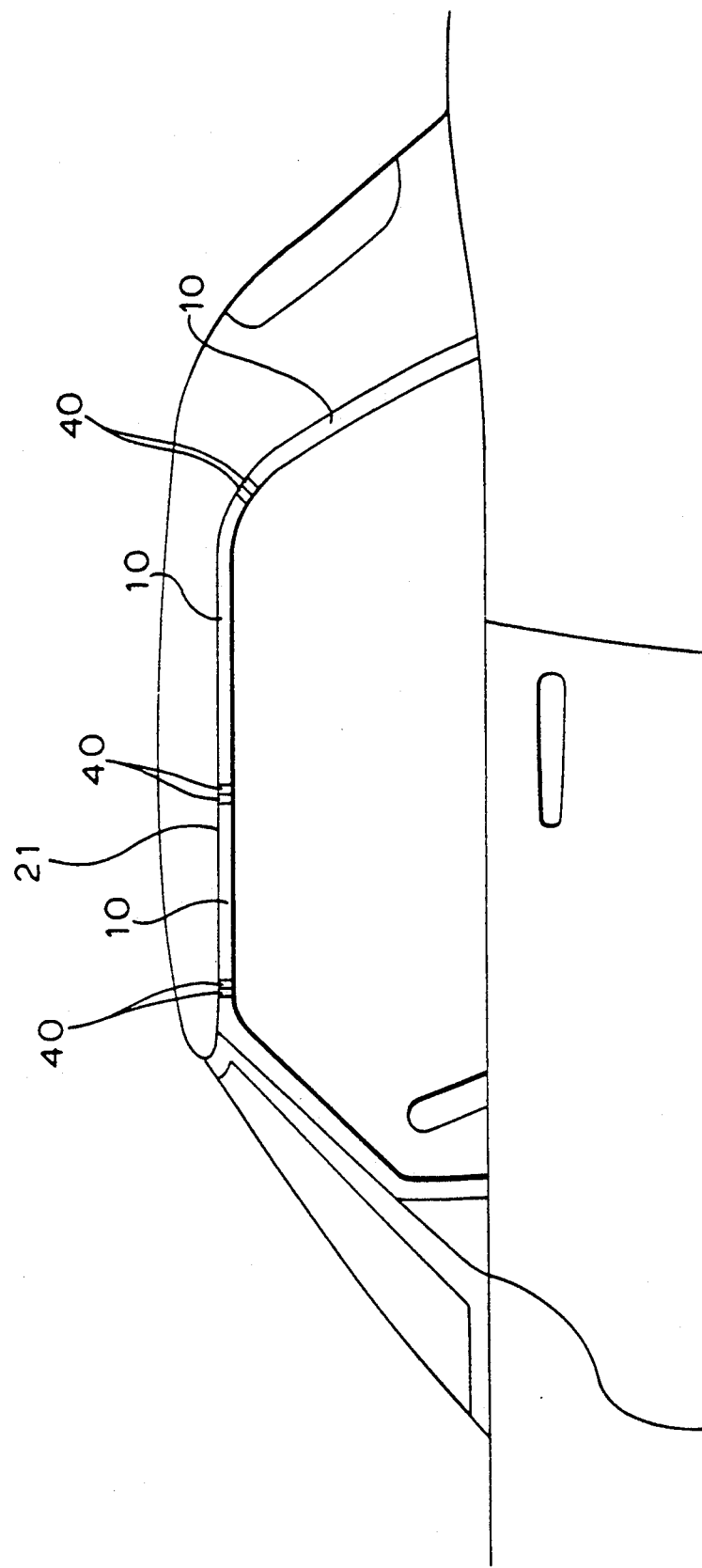
FIG. 3 is a diagramatic illustration of part of a vehicle illustrating the use of a door seal in accordance with the present invention.

Seals in accordance with the present invention are particularly suitable for sealing frameless sideglasses. The seal may be used with fixed head coupes but is particularly suitable for convertibles where it may be difficult to get good alignment of the edges of the sideglass with the hood of the vehicle. As illustrated in FIG. 3, for a convertible, the door seal 10 must be split to permit folding of the hood. In order to ensure a seal between sections of the door seal 10, soft closed cell sponge inserts 40 may be provided at the end of each section of seal 10, so that when the hood is erected, the abutting sponge inserts 40 will be compressed together to provide a seal therebetween.

I claim:

1. A door seal for a vehicle, for providing a seal between a door opening and a sideglass of a door comprising an elongate resilient strip having a body section adapted to be secured to the vehicle around the door opening, so that the body section is disposed inboard of the sideglass when the door is closed and the sideglass raised; and a lip section extending outwardly from the body section at an acute angle thereto, the lip section having a root portion by which it is attached to the body section and a tip remote from the root portion, the tip being directed back towards the body section such that when the door is closed with the sideglass raised, the tip will be deflected inwardly towards the root portion and the lip section will be engaged by the sideglass and will engage the sideglass on its outer surface and the body section of the seal engaging the sideglass on its inner surface.

2. A door seal according to claim 1 in which the body section is tubular.

3. A door seal according to claim 2 in which the body section defines a pair of axially extending ducts separated by a web portion.

4. A door seal according to claim 1 in which the elongate resilient strip is extruded from a natural or synthetic rubber composition.

5. A door seal according to claim 1 in which a sideglass engaging portion of the body section is made of a softer material than the remainder of the seal.

6. A door seal according to claim 5 in which the sideglass engaging portion of the body section is made from a closed cell sponge natural or synthetic rubber composition.

7. A door seal according to claim 6 in which the sideglass engaging portion of the body section and the remainder of the seal are formed by coextrusion.

8. A door seal according to claim 5 in which the sideglass engaging portion of the body section and the remainder of the seal are formed by coextrusion.

9. A door seal according to claim 1 in which the body section is provided with formations for engagement of corresponding formations of a channel section secured to the door opening.

10. A door seal according to claim 1 in which the seal is located around the door opening in sections, closed cell sponge inserts being provided at the end of each section the sponge insert at the end of one section abutting that at the end of the next section so that the sponge inserts are compressed together to provide a seal therebetween.

* * * * *